US012763580B2

(12) United States Patent
Shu et al.

(10) Patent No.: US 12,763,580 B2
(45) Date of Patent: Oct. 13, 2026

(54) DYNAMIC FREQUENCY COORDINATION CONTROL METHOD COMBINING FREQUENCY SYNCHRONOUS CONTROL IN VSC-HVDC WITH BILATERAL FREQUENCY LIMIT CONTROL IN LCC-HVDC

(71) Applicant: Kunming University of Science and Technology, Kunming (CN)

(72) Inventors: Hongchun Shu, Kunming (CN); Zongxue Shao, Kunming (CN); Shunguang Lei, Kunming (CN); Guangxue Wang, Kunming (CN); Yutao Tang, Kunming (CN); Botao Shi, Kunming (CN); Yinan Hu, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 106 days.

(21) Appl. No.: 19/026,429

(22) Filed: Jan. 17, 2025

(65) Prior Publication Data

US 2026/0074520 A1 Mar. 12, 2026

(30) Foreign Application Priority Data

Sep. 12, 2024 (CN) ........................ 202411273731.3

(51) Int. Cl.

*H02J 3/36* (2026.01)
*H02J 3/16* (2006.01)
*H02J 3/34* (2006.01)

(52) U.S. Cl.

CPC .................................... *H02J 3/36* (2013.01); *H02J 3/16* (2013.01); *H02J 3/34* (2013.01)

(58) Field of Classification Search

CPC ........ H02J 3/36; H02J 3/16; H02J 3/34; H02J 3/00142

See application file for complete search history.

(56) References Cited

U.S. PATENT DOCUMENTS 12,603,505 B2 * 4/2026 Shu .......................... H02J 3/36
2026/0121413 A1 * 4/2026 Shu .......................... H02J 3/16

* cited by examiner

*Primary Examiner* — Kyle J Moody

(74) *Attorney, Agent, or Firm* — Bayramoglu Law Offices LLC

(57) ABSTRACT

A dynamic frequency coordination control method combining frequency synchronous control in VSC-HVDC and bilateral FLC in LCC-HVDC includes: when a disturbance occurs in a system, the frequency synchronous control in VSC-HVDC is preferentially used to stabilize a grid frequency, and a power adjustment output by the frequency synchronous control in VSC-HVDC is taken as an activation criterion for the bilateral FLC control in LCC-HVDC; when the power adjustment exceeds a preset limiting range and a system frequency deviation exceeds a control dead zone of the bilateral FLC control in LCC-HVDC, the bilateral FLC control in LCC-HVDC is used to determine and output the power adjustment for LCC-HVDC; based on the power adjustment for LCC-HVDC, an additional reactive power control of VSC-HVDC is utilized to provide additional reactive power to LCC-HVDC to regulate a voltage stability of a grid.

7 Claims, 4 Drawing Sheets

(a)Only Frequency Synchronous Control in VSC-HVDC Activated (b)Only Bilateral Frequency Limit Control in LCC-HVDC Activated (c)Coordinated Control Proposed in This Invention Activated

DYNAMIC FREQUENCY COORDINATION CONTROL METHOD COMBINING FREQUENCY SYNCHRONOUS CONTROL IN VSC-HVDC WITH BILATERAL FREQUENCY LIMIT CONTROL IN LCC-HVDC

CROSS REFERENCE TO THE RELATED APPLICATIONS

This application is based upon and claims priority to Chinese Patent Application No. 202411273731.3, filed on Sep. 12, 2024, the entire contents of which are incorporated herein by reference.

TECHNOLOGY FIELD

This application relates to the field of power systems, particularly to a dynamic frequency coordination control method combining frequency synchronous control in voltage source converter based high voltage direct current (VSC-HVDC) with bilateral frequency limit control in line commutated converter based high voltage direct current (LCC-HVDC).

BACKGROUND

In the asynchronous interconnection project between the Yunnan power grid and the main grid of China Southern Power Grid, the two are connected via direct current (DC) without any alternating current (AC) interconnection channels. This fundamentally addresses the issue of large-scale power transfer to parallel AC channels due to DC faults in synchronous interconnection scenarios.

However, after the asynchronous interconnection of the Yunnan power grid and the main grid of China Southern Power Grid, Yunnan's power grid faces multiple challenges, including a high number of large-capacity units and DC systems, coupled with a relatively small total installed capacity and low load levels. These factors have led to a decline in frequency stability for each synchronous power grid. Especially within the Yunnan grid, which no longer receives frequency support from the main grid of China Southern Power Grid, severe DC blocking faults, trips of large units, or trips at large power plants may all lead to significant changes in the system frequency of the Yunnan power grid, potentially even causing long-term frequency excursions. This poses a severe challenge to the frequency stability of the Yunnan power grid. In view of this, there is an urgent need to propose a frequency coordination control method to enhance the frequency stability of the Yunnan power grid.

The aforementioned content is solely intended to facilitate understanding of the technical solution proposed in this application and does not constitute an acknowledgment that it represents prior art.

SUMMARY

The primary objective of this application is to provide a dynamic frequency coordination control method combining frequency synchronous control in VSC-HVDC with bilateral frequency limit control in LCC-HVDC. The aim is to propose a frequency coordination control method to enhance the frequency stability of the Yunnan power grid.

To achieve the aforementioned objective, this application provides a dynamic frequency coordination control method combining frequency synchronous control in VSC-HVDC with bilateral frequency limit control in LCC-HVDC. The method includes the following steps:

When a disturbance occurs in the system, the frequency synchronous control in VSC-HVDC is preferentially utilized to stabilize the grid frequency, and the power adjustment output by this control is taken as the triggering criterion for activating the bilateral frequency limit control in LCC-HVDC;

When the power adjustment exceeds a preset limit range and the system frequency deviation exceeds the control dead zone of the bilateral frequency limit control in LCC-HVDC, the latter is utilized to determine and output a conventional DC power adjustment;

Based on the conventional DC power adjustment, additional reactive power control in VSC-HVDC is utilized to provide additional reactive power to the LCC-HVDC, in order to regulate the voltage stability of the power grid.

In one embodiment, the inputs for the frequency synchronous control in VSC-HVDC are respectively a first difference corresponding to the difference between the sending-end grid frequency and the system frequency reference value, and a second difference corresponding to the difference between the receiving-end grid frequency and the system frequency reference value. The method further includes:

Determining a flexible DC power adjustment based on the preprocessed first and second differences;

Adding the flexible DC power adjustment to the original power reference value of the flexible DC to determine the active power command for the flexible DC;

Adjusting the actual operating active power of the flexible DC based on the active power command.

In one embodiment, the inputs for the bilateral frequency limit control in LCC-HVDC are respectively a first difference corresponding to the difference between the sending-end grid frequency and the system frequency reference value, and a second difference corresponding to the difference between the receiving-end grid frequency and the system frequency reference value. The method further includes:

Determining the conventional DC power adjustment output by the bilateral frequency limit control in LCC-HVDC based on the preprocessed first and second differences;

Performing logical judgment, normalization to per-unit values, and Proportional-Integral (PI) control on the conventional DC power adjustment, and then converting it into a corresponding trigger angle adjustment;

Adjusting the actual operating active power of the conventional DC based on the trigger angle adjustment.

In one embodiment, the method further includes:

Taking the flexible DC power adjustment as an input signal for the judgment logic;

Converting the input signal into an additional reactive power amount for the flexible DC;

Adding the additional reactive power to the original reactive power command of the flexible DC to generate a new reactive power command for the flexible DC;

Adjusting the actual operating reactive power of the flexible DC based on the reactive power command.

In one embodiment, the judgment logic includes:

If the flexible DC power adjustment exceeds the maximum power adjustment threshold of the VSC-HVDC frequency synchronous controller, or if the power adjustment is less than the minimum power adjustment threshold of the VSC-HVDC frequency synchronous controller, then the LCC-HVDC bilateral FLC control outputs the conventional DC power adjustment;

If the flexible DC power adjustment is greater than or equal to the minimum power adjustment threshold of the frequency synchronous controller for VSC-HVDC and less than or equal to its maximum power adjustment threshold, then the bilateral frequency limit control in LCC-HVDC outputs 0.

In one embodiment, the active power command and the reactive power command of the flexible DC pass through a dynamic limiting link containing PI control to generate the target active power command and target reactive power command required for the inner loop control of the flexible DC. The target active power command and target reactive power command satisfy preset dynamic limiting constraints.

In one embodiment, the calculation method for the maximum power adjustment threshold of the frequency synchronous controller for VSC-HVDC is as follows:

Calculate a first product value corresponding to the rated power of the flexible DC and the overload capability coefficient of the flexible DC;

Calculate a third difference corresponding to the difference between the product value and the actual power of the flexible DC, and use this third difference as the maximum power adjustment threshold; and, The calculation method for the minimum power adjustment threshold of the frequency synchronous controller for VSC-HVDC is as follows:

Calculate a second product value corresponding to the minimum operating level coefficient of the flexible DC and the rated power of the flexible DC;

Calculate a fourth difference corresponding to the difference between the actual operating power of the flexible DC and the second product value, and use this fourth difference as the minimum power adjustment threshold.

In one embodiment, the control dead zone for the bilateral frequency limit control in LCC-HVDC is ±0.1 Hz to ±0.14 Hz.

In one embodiment, the additional reactive power is the additional reactive power of the flexible DC, and the calculation method for the additional reactive power of the flexible DC is as follows:

Calculating the product of the conventional DC power adjustment and tan φ, where φ is the power factor on the valve side of the conventional DC connected to the flexible DC.

In one embodiment, the power adjustment of the bilateral frequency limit control in LCC-HVDC also corresponds to an upper limit and a lower limit of power adjustment. The calculation method for the upper limit of power adjustment is as follows:

Calculate the third product value by multiplying the rated power of the conventional DC (LCC-HVDC) by the conventional DC overload capacity coefficient;

Calculate the fifth difference between the third product value and the actual operating power of the conventional DC. Set this fifth difference as the upper limit of power adjustment;

Additionally, to calculate the lower limit of power adjustment:

Calculate the fourth product value by multiplying the minimum operating level coefficient of the conventional DC power by its rated power;

Calculate the sixth difference between the actual operating power of the conventional DC and the fourth product value. Set this sixth difference as the lower limit of power adjustment.

The embodiment of this application provides a dynamic frequency coordination control method combining frequency synchronous control in VSC-HVDC and bilateral frequency limit control in LCC-HVDC, which includes VSC-HVDC frequency synchronous control, LCC-HVDC bilateral FLC control, and power coordination control. Firstly, when a disturbance occurs in the system, VSC-HVDC frequency synchronous control is prioritized to stabilize the grid frequency. The power adjustment output by the VSC-HVDC frequency synchronous control is used as the activation criterion for LCC-HVDC bilateral FLC control and power coordination control. When the power adjustment exceeds a preset limit range and the system frequency deviation exceeds the control dead zone of the LCC-HVDC bilateral FLC control, the LCC-HVDC bilateral FLC control is utilized to determine and output the conventional DC power adjustment. Finally, based on the conventional DC power adjustment, additional reactive power control of the VSC-HVDC is employed to provide additional reactive power to the LCC-HVDC, thereby regulating the frequency stability of the grid.

BRIEF DESCRIPTION OF THE DRAWINGS

FIG. 3A depicts the grid frequency simulation result when only the frequency synchronous control in VSC-HVDC is engaged:

FIG. 3B shows the grid frequency simulation result when only the bilateral frequency limit control in LCC-HVDC is engaged;

FIG. 3C illustrates the grid frequency simulation result when only the coordinated control proposed in this application is engaged;

DETAILED DESCRIPTION OF THE EMBODIMENTS

It should be understood that the specific embodiments described herein are merely used to explain the present application and are not intended to limit it.

Figure 1:
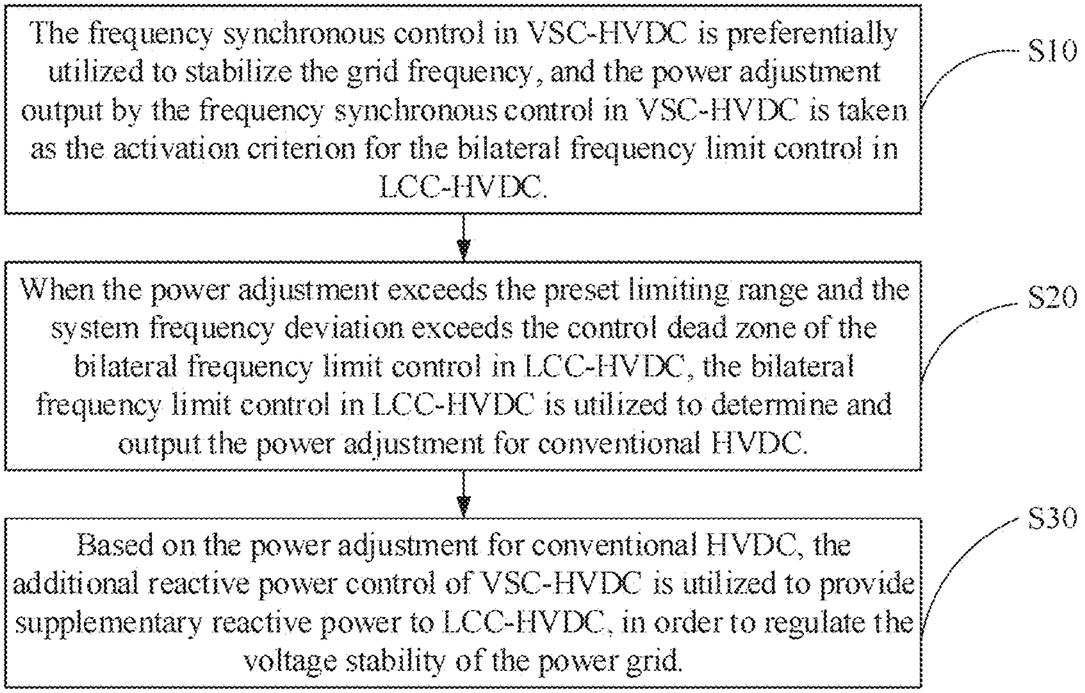
FIG. 1 illustrates a flowchart of the first embodiment of a dynamic frequency coordination control method combining frequency synchronous control in VSC-HVDC and bilateral frequency limit control in LCC-HVDC, as proposed in this application.

The embodiment of the present application provides a dynamic frequency coordination control method combining frequency synchronous control in VSC-HVDC and bilateral FLC in LCC-HVDC. Referring to FIG. 1, it illustrates a flowchart of the first embodiment of the dynamic frequency coordination control method combining frequency synchronous control in VSC-HVDC and bilateral FLC in LCC-HVDC according to the present application.

In this embodiment, the dynamic frequency coordination control method combining frequency synchronous control in VSC-HVDC and bilateral FLC in LCC-HVDC includes the following steps:

Step S10: When a disturbance occurs in the system, priority is given to using the VSC-HVDC frequency synchronous control to stabilize the grid frequency, and the power adjustment output by the VSC-HVDC frequency synchronous control is taken as the activation criterion for the bilateral FLC control in LCC-HVDC.

Step S20: When the power adjustment exceeds the preset limit range and the system frequency deviation exceeds the control dead zone of the bilateral FLC control in LCC-HVDC, the bilateral FLC control in LCC-HVDC is utilized to determine and output the conventional DC power adjustment.

Step S30: Based on the conventional DC power adjustment, the VSC-HVDC additional reactive power control is utilized to provide additional reactive power to the LCC-HVDC, in order to regulate the voltage stability of the grid.

In this embodiment, three control methods are integrated: VSC-HVDC frequency synchronous control, bilateral FLC in LCC-HVDC, and power coordination control. Among them, VSC-HVDC frequency synchronous control technology can effectively achieve frequency synchronous operation between asynchronously interconnected power grid zones and real-time, automatic sharing of frequency regulation resources across the entire grid. Bilateral FLC control in LCC-HVDC enhances the ability of the DC transmission system to provide inertia and primary frequency regulation support to both sides of the grid by introducing frequency additional control on the rectifier and inverter sides within the DC transmission system. Power coordination control is used to optimize power flow and stability in the power system.

Furthermore, when a disturbance occurs in the system, priority is given to using VSC-HVDC frequency synchronous control to stabilize the grid frequency. The power adjustment output by VSC-HVDC frequency synchronous control (hereinafter referred to as $\Delta P_{d1}$) serves as the activation criterion for bilateral FLC control in LCC-HVDC and power coordination control. When $\Delta P_{d1}$ exceeds the preset limit range and the system frequency deviation exceeds the control dead zone of bilateral FLC control in LCC-HVDC, the bilateral FLC control in LCC-HVDC begins to output a conventional DC power adjustment. Based on this conventional DC power adjustment, VSC-HVDC additional reactive power control is utilized to provide the required additional reactive power $\Delta Q$ to LCC-HVDC, thereby regulating the voltage stability of the grid.

In a power system, the control dead zone of bilateral FLC in LCC-HVDC is used to prevent the power system from adjusting the control input too frequently within a small error range. When the system frequency deviation does not exceed the control dead zone of bilateral FLC in LCC-HVDC, no adjustment is required at this time. However, when the system frequency deviation exceeds the control dead zone of bilateral FLC in LCC-HVDC, it is necessary to output a power adjustment. Optionally, in a feasible implementation, the dead zone of bilateral FLC in LCC-HVDC is set to ±0.1 Hz to ±0.14 Hz. The calculation formula for the additional reactive power $\Delta Q$ of VSC-HVDC is as follows:

$$\Delta Q = \Delta P_{d2} \tan\varphi$$

In the formula, $\varphi$ represents the power factor on the valve side of the conventional DC connected to the VSC-HVDC.

In this embodiment, by utilizing VSC-HVDC frequency synchronous control, consistency and synchronization of the frequencies between the sending-end grid and the receiving-end grid can be ensured within the range of power adjustment, enabling real-time and automatic sharing of frequency regulation resources between the sending and receiving ends of the grid. By employing bilateral FLC in LCC-HVDC, the frequency regulation effect can be enhanced, taking into account the frequency fluctuations of both the sending-end grid and the receiving-end grid. With power coordination control, reactive power support can be provided to the conventional DC, avoiding frequent operation of the converter transformers and filters of the conventional DC during the action of bilateral FLC, thereby extending the service life of DC equipment. Through the above methods, the power stability of the grid system is improved.

Furthermore, in another embodiment, the inputs of VSC-HVDC frequency synchronous control are the first difference between the sending-end grid frequency $f_R$ and the system frequency reference value $f_{ref}$, and the second difference between the receiving-end grid frequency $f_I$ and the system frequency reference value $f_{ref}$. The calculated frequency deviations are further preprocessed through control stages such as filtering, direct current (DC) component elimination, PI control, and limiting. Based on the preprocessed first and second differences, the VSC-HVDC power adjustment $\Delta P_{d1}$ is output. This power adjustment is then superimposed on the original power reference value $P_0$ of the VSC-HVDC to obtain a new active power command $P_{ref}$ for the VSC-HVDC. Based on this active power command $P_{ref}$, the actual operating power of the VSC-HVDC is automatically adjusted.

Furthermore, the inputs of bilateral FLC control in LCC-HVDC are also the first difference between the sending-end grid frequency $f_R$ and the system frequency reference value $f_{ref}$, and the second difference between the receiving-end grid frequency $f_I$ and the system frequency reference value $f_{ref}$. The calculated frequency deviations undergo preprocessing through control stages such as dead zone filtering, PI control, and limiting. Based on the preprocessed data, the bilateral FLC control in LCC-HVDC outputs a conventional DC power adjustment $\Delta P_{d2}$. The conventional DC power adjustment $\Delta P_{d2}$ then undergoes logical judgment A, normalization, PI control, and other processes to calculate the corresponding trigger angle adjustment $\Delta\alpha$. Based on the trigger angle adjustment $\Delta\alpha$, the actual operating power of the conventional DC is automatically adjusted. The logical judgment A is performed based on predefined judgment logic.

The power coordination control includes the following: a judgment logic A, an input signal $\Delta P_{d1}$ for the judgment logic A, and an additional reactive power $\Delta Q$ corresponding to the input signal $\Delta P_{d1}$ after conversion. The additional reactive power $\Delta Q$ is superimposed on the original reactive power command $Q_0$ of the VSC-HVDC to generate a new reactive power command $Q_{ref}$ for the VSC-HVDC. The judgment logic A includes the following: if the VSC-HVDC power adjustment $\Delta P_{d1}$ is greater than the maximum power adjustment threshold $\Delta P_{max1}$ of the VSC-HVDC frequency synchronous controller, or if $\Delta P_{d1}$ is less than the minimum power adjustment threshold $\Delta P_{min1}$ of the controller, then the bilateral FLC control in LCC-HVDC outputs a conventional DC power adjustment $\Delta P_{d2}$. If the VSC-HVDC power adjustment $\Delta P_{d1}$ falls within the range between the minimum power adjustment threshold $\Delta P_{min1}$ and the maximum power adjustment threshold $\Delta P_{max1}$ of the VSC-HVDC frequency synchronous controller, then the bilateral FLC control in LCC-HVDC outputs 0. In addition, active power commands and reactive power commands are used to control the active and reactive powers of the grid. Active power commands control the injection or absorption of actual power, which is used for power transmission. Reactive power commands control the voltage and power factor of the grid, ensuring voltage stability in the grid.

It should be noted that the active power command $P_{ref}$ and the reactive power command $Q_{ref}$ for VSC-HVDC will undergo a dynamic limiting stage with PI control to generate the target active power command $i_{dref}$ and the target reactive power command $i_{qref}$ required for the inner-loop control of VSC-HVDC. The dynamic limiting constraints for the active power command $i_{dref}$ and the reactive power command $i_{qref}$ are as follows:

$$\sqrt{i_{dref}^2 + i_{qref}^2} \leq 1.2$$

In another embodiment, the calculation method for the maximum power adjustment threshold $\Delta P_{max1}$ of the VSC-HVDC frequency synchronous controller is as follows: calculate the first product value, which is the product of the rated power of the VSC-HVDC and the overload capability coefficient of the VSC-HVDC, calculate the third difference, which is the difference between the product value and the actual power of the VSC-HVDC, use the third difference as the maximum power adjustment threshold $\Delta P_{max1}$. The specific calculation formula is as follows:

$$\Delta P_{max1} = k_1 P_{N1} - P_1$$

In the formula provided, $P_{N1}$ represents the rated power of the VSC-HVDC system, $P_1$ represents the actual operating power of the VSC-HVDC, and $k_1$ represents the overload capability coefficient of the VSC-HVDC. Currently, the maximum value of $k_1$ is generally taken as 1.05. However, as the capacity of the switching devices in the VSC-HVDC converter valves increases, the maximum value of/is expected to continue to increase.

The calculation method for the minimum power adjustment threshold $\Delta P_{min1}$ of the VSC-HVDC frequency synchronous controller is as follows: calculate the second product value, which is the product of the minimum operating level coefficient of the VSC-HVDC power and the rated power of the VSC-HVDC, calculate the fourth difference, which is the difference between the actual operating power of the VSC-HVDC and the second product value, use the fourth difference as the minimum power adjustment threshold $\Delta P_{min1}$. Specifically, the formula for calculating the minimum power adjustment threshold $\Delta P_{min1}$ of the VSC-HVDC frequency synchronous controller is as follows:

$$\Delta P_{min1} = P_1 - m_1 P_{N1}$$

In the formula provided, $m_1$ represents the minimum operating level coefficient of the VSC-HVDC power. When the VSC-HVDC converter valves adopt a hybrid structure of full-bridge submodules and half-bridge submodules, $m_1$ can be set to zero. When the value of m is less than zero, it indicates that a power flow reversal occurs in the VSC-HVDC system. The specific value of $m_1$ is determined by the actual operating conditions.

In addition, the bilateral FLC in LCC-HVDC also has corresponding upper and lower limits for power adjustment, denoted as $\Delta P_{max2}$ and $\Delta P_{min2}$. The calculation method for the upper limit of power adjustment $\Delta P_{max2}$ is as follows: calculate the third product value, which is the product of the rated power of the conventional HVDC and the overload capability coefficient of the conventional HVDC, calculate the fifth difference, which is the difference between the third product value and the actual operating power of the conventional HVDC, use the fifth difference as the upper limit of power adjustment $\Delta P_{max2}$. Specifically, the formula for calculating the upper limit of power adjustment $\Delta P_{max2}$ is as follows:

$$\Delta P_{max2} = k_2 P_{N2} - P_2$$

In the formula, $P_{N2}$ represents the rated power of the LCC-HVDC, $P_2$ represents the actual operating power of the conventional HVDC, and $k_2$ represents the overload capability coefficient of the conventional HVDC. For long-term overload conditions, the maximum value of $k_2$ is generally taken as 1.1, while for short-term overload conditions, the maximum value of $k_2$ is generally taken as 1.2.

The calculation method for the lower limit of power adjustment $\Delta P_{min2}$ is as follows: calculate the fourth product value, which is the product of the minimum operating level coefficient of the conventional HVDC and its rated power, calculate the sixth difference, which is the difference between the actual operating power of the conventional HVDC and the fourth product value, use the sixth difference as the lower limit of power adjustment. Specifically, the formula for calculating the lower limit of power adjustment $\Delta P_{min2}$ for the bilateral frequency limit control in LCC-HVDC is as follows:

$$\Delta P_{min2} = P_2 - m_2 P_{N2}$$

In the formula, $m_2$ represents the minimum operating level coefficient for the conventional HVDC power. The value of $m_2$ is taken as 0.5.

It is understandable that the terms "first," "second," "third," etc., in the various embodiments of this application are used solely for distinguishing nouns and do not impose any order of precedence or size limitations on the nouns.

Figure 2:
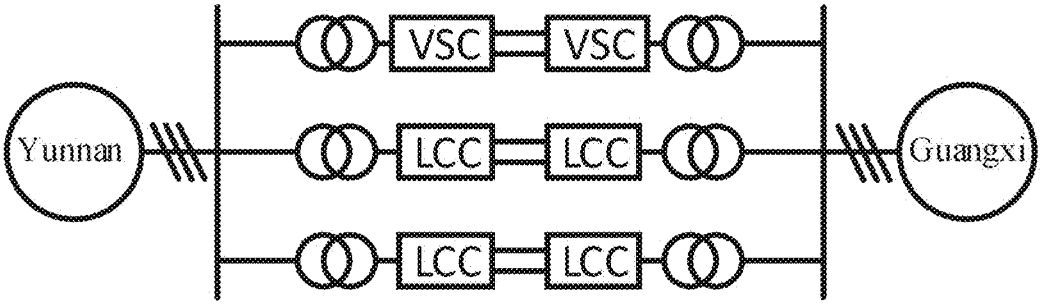
FIG. 2 is a schematic diagram of the simulation structure for the Luxi back-to-back model as proposed in this application.
Figure 3A:
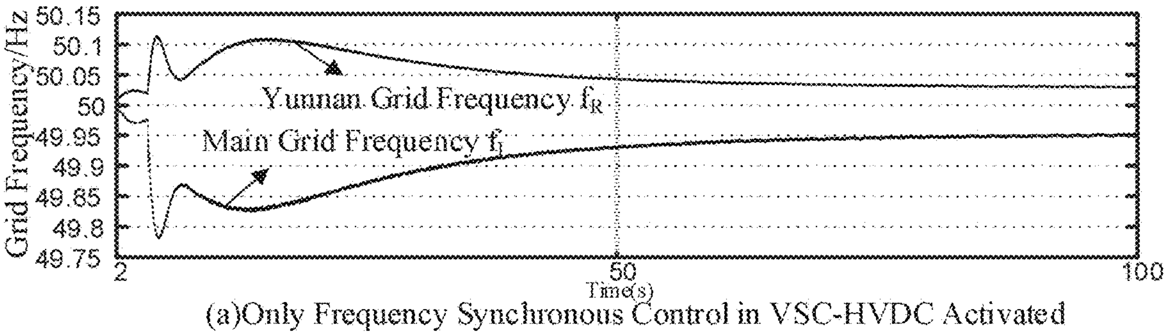
FIGS. 3A-3C are schematic diagrams of the grid frequency simulation results for this application. Specifically.
Figure 3B:
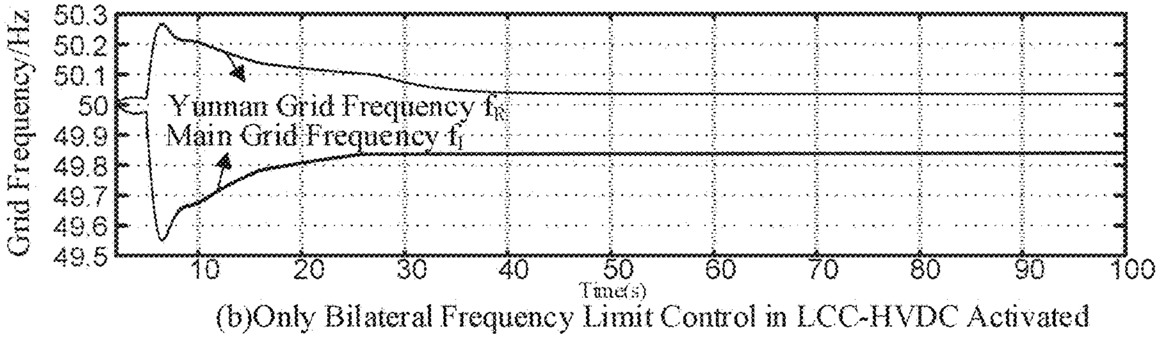
Figure 3C:
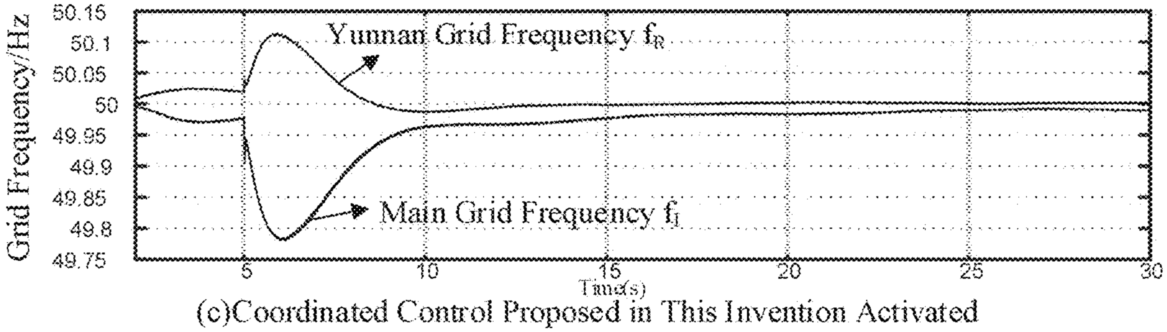
Figure 4:
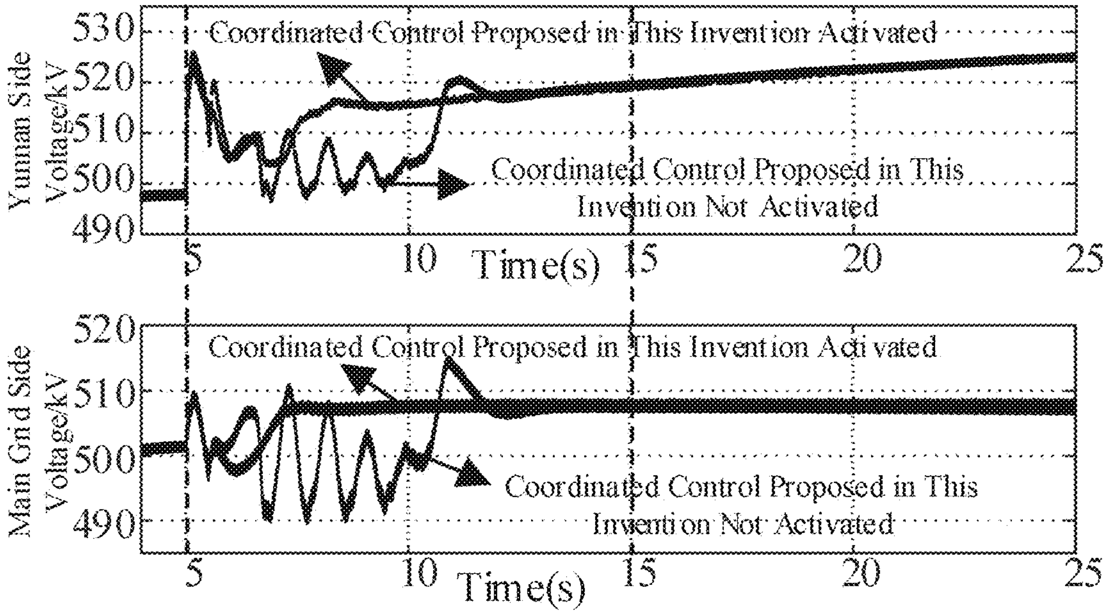
FIG. 4 is a schematic diagram of the simulation results for the valve-side voltage of the conventional HVDC (LCC-HVDC) as proposed in this application.

To validate the dynamic frequency coordination control technology proposed in this application, which integrates frequency synchronous control in VSC-HVDC with bilateral frequency limit control in LCC-HVDC, a Luxi back-to-back simulation model as shown in FIG. 2 was constructed on the PSCAD/EMTDC simulation platform. This simulation modeled a monopole blocking event at a back-to-back conventional HVDC LCC link at 5 seconds, resulting in a power loss of 400 MW. As illustrated in FIGS. 3A-3C, which presents the grid frequency simulation results, FIG. 3A shows the grid frequency simulation result when only frequency synchronous control in VSC-HVDC is engaged, FIG. 3B shows the result when only bilateral FLC in LCC-HVDC is engaged, and FIG. 3C shows the result when only the proposed coordination control technique is engaged. It can be observed that after the monopole blocking of the conventional HVDC, the Yunnan side experiences over-frequency while the main grid side experiences under-frequency. Comparing FIGS. 3A-3C, we find that: when frequency synchronous control in VSC-HVDC is used, the peak frequency of the Yunnan grid reaches 50.12 Hz and the lowest frequency of the main grid is 49.78 Hz. Due to the power adjustment exceeding its limit, the frequencies on both sides fail to synchronize. When bilateral FLC in LCC-HVDC is used, the peak frequency of the Yunnan grid reaches 50.27 Hz and the lowest frequency of the main grid is 49.58 Hz. Similarly, due to the power adjustment exceeding its limit, the frequencies on both sides fail to enter the control dead zone. When the proposed coordination control technique is used, the peak frequency of the Yunnan grid is 50.12 Hz and the lowest frequency of the main grid is 49.78 Hz. The frequencies on both sides can synchronize, demonstrating the significant frequency control effect of the proposed coordination control. As shown in FIG. 4, which presents the simulation results for the valve-side voltage of the conventional HVDC, it can be seen that during the action of bilateral FLC in LCC-HVDC, the AC voltage oscillations on both the Yunnan side and the main grid side are significant. However, after adopting the proposed coordination control technique, the VSC-HVDC provides real-time reactive power support to the LCC-HVDC, reducing the AC voltage oscillations on both sides.

The above detailed description of the specific embodiment is provided to facilitate the understanding and application of this application by ordinary technicians in the technical field, but this application is not limited to the described embodiment. The fundamental idea of this application lies in providing a dynamic frequency coordination control technology that integrates frequency synchronous control in VSC-HVDC with bilateral frequency limit control in LCC-HVDC, rather than being specific to the power grid system in which this coordination control technology is applied. Any power grid system that employs the coordination control technology and this application falls within the scope of protection of this application. Therefore, this application is not limited to the above embodiment, and any improvements or modifications made to this application by technicians in the field based on the disclosure of this application should be within the scope of protection of this application.

Furthermore, in this document, the terms "including," "containing," or any other variations thereof are intended to encompass non-exclusive inclusion, such that a process, method, article, or system that includes a series of elements not only includes those elements but may also include other elements not explicitly listed, or may further include elements that are inherent to such a process, method, article, or system. In the absence of further restrictions, elements defined by the phrase "including one . . . " do not exclude the presence of additional identical elements in the process, method, article, or system that includes that element.

The serial numbers assigned to the embodiments of the present application mentioned above are solely for descriptive purposes and do not represent the superiority or inferiority of the embodiments.

Through the description of the above embodiments, technical personnel in the field can clearly understand that the methods of the above embodiments can be implemented through a combination of software and necessary general-purpose hardware platforms. Of course, they can also be implemented through hardware, but in many cases, the former is a better implementation approach. Based on this understanding, the technical solution of the present application, or the part that contributes to the prior art, can be embodied in the form of a software product. This computer software product is stored in a storage medium as described above (such as ROM/RAM, magnetic disks, optical disks), and includes several instructions for causing a terminal device (which can be a mobile phone, computer, server, network device, etc.) to execute the methods described in various embodiments of the present application.

What is claimed is:

1. A dynamic frequency coordination control method combining frequency synchronous control in voltage source converter based high voltage direct current (VSC-HVDC) with bilateral frequency limit control in line commutated converter based high voltage direct current (LCC-HVDC), comprising the following steps:

Step 1: during system disturbances, prioritizing the frequency synchronous control in the VSC-HVDC to stabilize a grid frequency, and using a power adjustment output by the frequency synchronous control as an activation criterion for the bilateral frequency limit control in the LCC-HVDC;

Step 2: when the power adjustment exceeds a preset limit range and a system frequency deviation exceeds a control dead zone of the bilateral frequency limit control in the LCC-HVDC, utilizing the bilateral frequency limit control to determine and output a conventional direct current (DC) power adjustment;

Step 3: based on the conventional DC power adjustment, employing additional reactive power control of the VSC-HVDC to provide additional reactive power to the LCC-HVDC to regulate a voltage stability of a grid;

Step 4: using a VSC-HVDC power adjustment as an input signal for a judgment logic;

Step 5: converting the input signal into additional reactive power for the VSC-HVDC;

Step 6: superimposing the additional reactive power on an original reactive power command of the VSC-HVDC to generate a new reactive power command for the VSC-HVDC; and Step 7: adjusting an actual operating reactive power of the VSC-HVDC based on the new reactive power command;

wherein Step 4 comprises:

Step 4.1: when the VSC-HVDC power adjustment is greater than a maximum power adjustment threshold of a frequency synchronous controller, or when the VSC-HVDC power adjustment is less than a minimum power adjustment threshold of the frequency synchronous controller, allowing the bilateral frequency limit control in the LCC-HVDC to output the conventional DC power adjustment; and Step 4.2: when the VSC-HVDC power adjustment is greater than or equal to the minimum power adjustment threshold of the frequency synchronous controller and less than or equal to the maximum power adjustment threshold of the frequency synchronous controller, allowing the bilateral frequency limit control in the LCC-HVDC to output 0;

wherein in Step 3, the additional reactive power mentioned is the additional reactive power for the VSC-HVDC, and a method to calculate the additional reactive power for the VSC-HVDC is as follows:

a product of the conventional DC power adjustment and tan φ is calculated, wherein φ represents a power factor of a valve side of the conventional DC connected to the VSC-HVDC.

2. The dynamic frequency coordination control method according to claim 1, wherein inputs of the frequency synchronous control in the VSC-HVDC are respectively a first difference between a sending-end grid frequency and a system frequency reference value and a second difference between a receiving-end grid frequency and the system frequency reference value, and the dynamic frequency coordination control method further comprises:

determining the VSC-HVDC power adjustment based on preprocessed first and second differences;

superimposing the VSC-HVDC power adjustment on an original power reference value of the VSC-HVDC to determine an active power command for the VSC-HVDC; and adjusting an actual operating active power of the VSC-HVDC based on the active power command.

3. The dynamic frequency coordination control method according to claim 1, wherein inputs of the bilateral frequency limit control in the LCC-HVDC are respectively a first difference between a sending-end grid frequency and a system frequency reference value and a second difference between a receiving-end grid frequency and the system frequency reference value, and the dynamic frequency coordination control method further comprises:

determining the conventional DC power adjustment output by the bilateral frequency limit control in the LCC-HVDC based on preprocessed first and second differences;

performing logical judgment, normalization, and Proportional-Integral (PI) control on the conventional DC power adjustment based on the judgment logic to obtain a result, and then converting the result into a firing angle adjustment; and adjusting an actual operating active power of the conventional DC based on the firing angle adjustment.

4. The dynamic frequency coordination control method according to claim 1, wherein an active power command and a reactive power command of the VSC-HVDC are processed through a dynamic limiting link with PI control to generate a target active power command and a target reactive power command required for an inner loop control of the VSC-HVDC, wherein the target active power command and the target reactive power command satisfy preset dynamic limiting constraints.

5. The dynamic frequency coordination control method according to claim 1, wherein a method for calculating the maximum power adjustment threshold of the frequency synchronous controller in the VSC-HVDC comprises:

calculating a first product value corresponding to a rated power of the VSC-HVDC and an overload capacity coefficient of the VSC-HVDC; and calculating a third difference between the first product value and an actual power of the VSC-HVDC, and using the third difference as the maximum power adjustment threshold;

wherein a method for calculating the minimum power adjustment threshold of the frequency synchronous controller in the VSC-HVDC comprises:

calculating a second product value corresponding to a minimum operating level coefficient of the VSC-HVDC and the rated power of the VSC-HVDC; and calculating a fourth difference between an actual operating power of the VSC-HVDC and the second product value, and using the fourth difference as the minimum power adjustment threshold.

6. The dynamic frequency coordination control method according to claim 1, wherein the control dead zone of the bilateral-frequency limit control in the LCC-HVDC ranges from ±0.1 Hz to ±0.14 Hz.

7. The dynamic frequency coordination control method according to claim 1, wherein a power adjustment for the bilateral frequency limit control in the LCC-HVDC also corresponds to an upper limit and a lower limit of the power adjustment, wherein a method for calculating the upper limit of the power adjustment comprises:

calculating a third product value corresponding to a rated power of the LCC-HVDC and an overload capacity coefficient of the LCC-HVDC;

calculating a fifth difference between the third product value and an actual operating power of the LCC-HVDC, and using the fifth difference as the upper limit of the power adjustment;

wherein a method for calculating the lower limit of the power adjustment comprises:

calculating a fourth product value corresponding to a minimum operating level coefficient of the LCC-HVDC and the rated power of the LCC-HVDC; and calculating a sixth difference between the actual operating power of the LCC-HVDC and the fourth product value, and using the sixth difference as the lower limit of the power adjustment.

* * * * *